Sept. 1, 1953 M. S. DE LAY Re. 23,704

LOAD EQUALIZING DEVICE

Original Filed Dec. 14, 1950 3 Sheets-Sheet 1

INVENTOR.
Manford S. DeLay
BY Christian R. Nielsen
ATTORNEY

LOAD EQUALIZING DEVICE
Original Filed Dec. 14, 1950 3 Sheets-Sheet 2
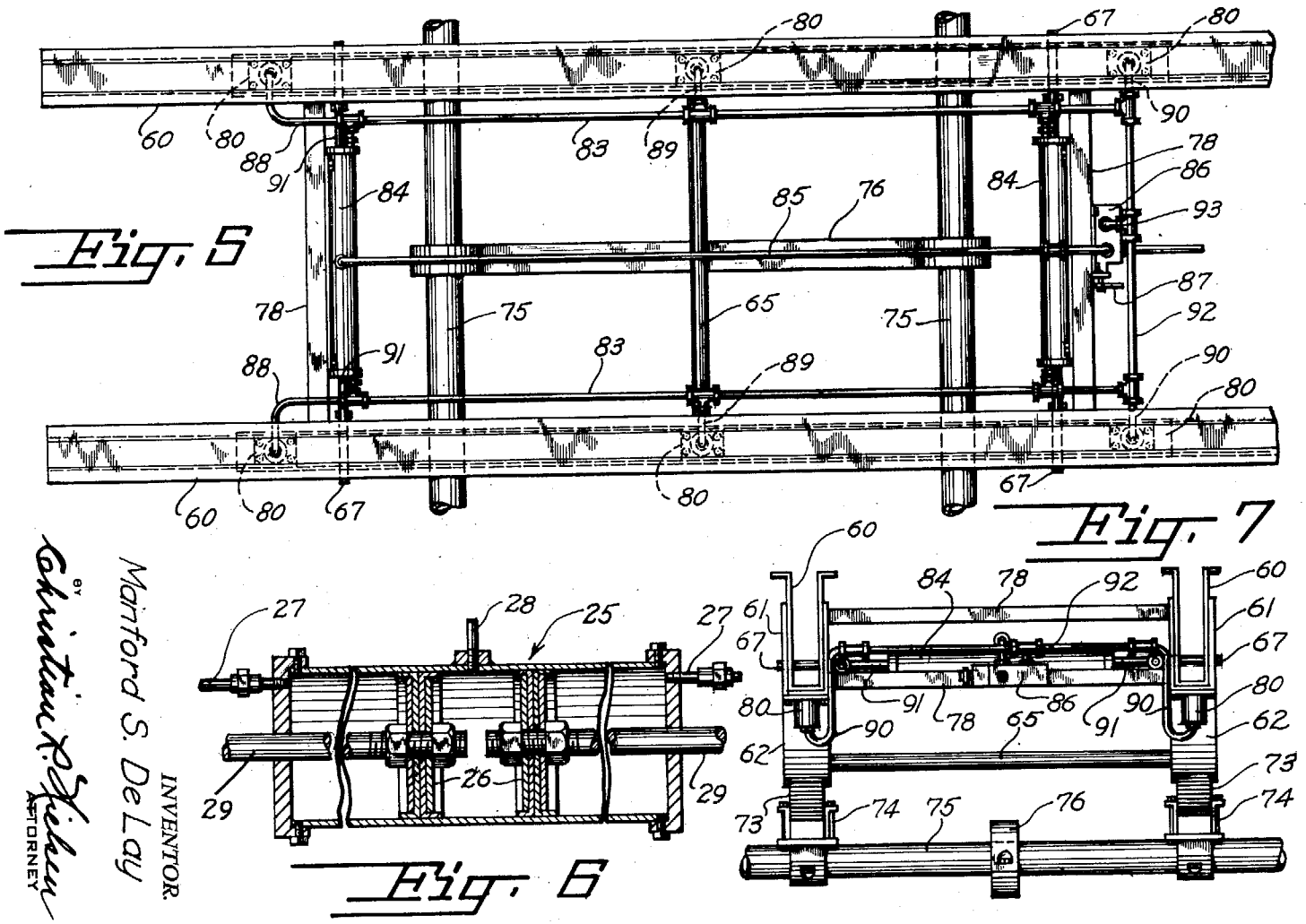
INVENTOR.
Manford S. De Lay
BY Christian R. Hickey
ATTORNEY Sept. 1, 1953 M. S. DE LAY Re. 23,704
LOAD EQUALIZING DEVICE
Original Filed Dec. 14, 1950 3 Sheets-Sheet 3
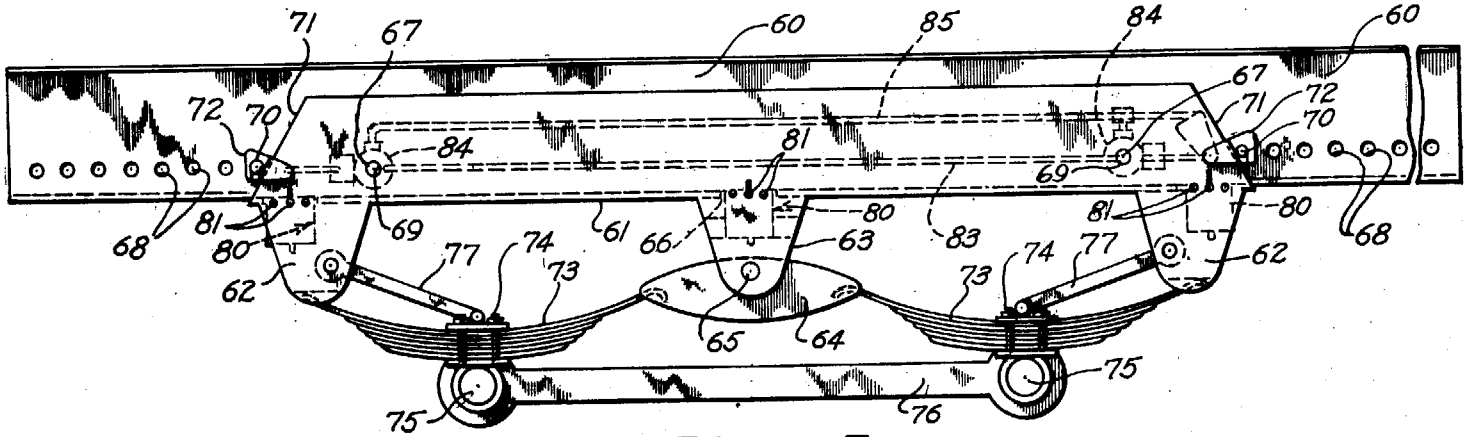
Fig. 8
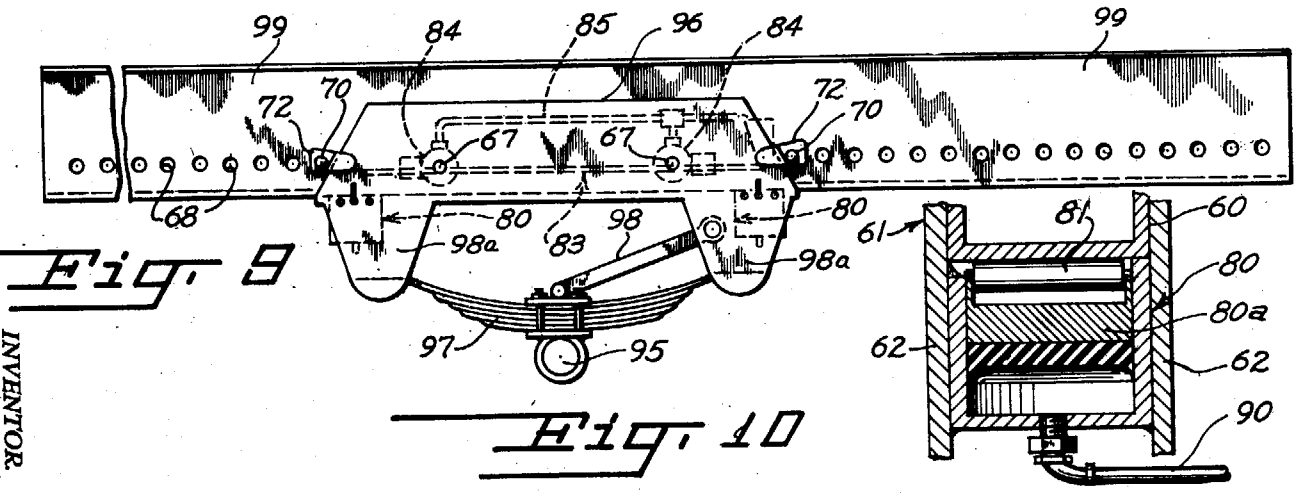
Fig. 9
Fig. 10
INVENTOR.
Manford S. De Lay
BY
Christian R. Nielsen
ATTORNEY Reissued Sept. 1, 1953 Re. 23,704

UNITED STATES PATENT OFFICE 23,704

LOAD EQUALIZING DEVICE

Manford S. De Lay, St. Louis, Mo., assignor to De Lay Industries, Inc., St. Louis, Mo.

Original No. 2,589,678, dated March 18, 1952, Serial No. 200,829, December 14, 1950. Application for reissue August 13, 1952, Serial No. 304,231

8 Claims. (Cl. 280—33.05)

Matter enclosed in heavy brackets [ ] appears in the original patent but forms no part of this reissue specification; matter printed in italics indicates the additions made by reissue.

This invention relates to a load equalizing device for use on tractors or trailers carrying heavy loads.

An object of the invention is the provision of a load equalizer in which a fifth wheel mounting is shifted forwardly or rearwardly to cause more of the load to be supported by the front or rear wheels respectively of a truck pulling semi-trailers.

Another object of the invention is the provision of a load equalizer in which an auxiliary frame is mounted adjustably on a main frame attached to the trailer body, said auxiliary frame being supported by springs and at least one axle with torque arms controlling in a definite manner, the movement of the springs and axle, fluid pressure actuated pins retaining the auxiliary frame in predetermined positions on the main frame with fluid actuated means separating the frame sufficiently for adjustment.

A further object of the invention is the provision of a load equalizer in which a plurality of means is employed for shifting the fifth wheel mounting of a tractor or an auxiliary frame relative to a main frame of a semi-trailer for varying the load applied to the front or rear wheels of the tractor or for varying the load applied to the tractor by the trailer, the auxiliary frame attached to the fifth wheel mounting of a tractor or the auxiliary frame of the trailer being displaced relative to the respective main frames of the tractor or trailer by a fluid operated means so that the fifth wheel mounting or the trailer body may be moved forwardly or rearwardly.

This invention is best understood from a consideration of the following detailed description taken in conjunction with the accompanying drawings forming part of the specification, nevertheless, it must be borne in mind that the invention is not confined to the disclosure but is susceptible of such changes and modifications as shall define no material departure from the salient features of the invention, as expressed in the appended claims.

In the drawings:

Figure 5 is a plan view of a modified form of a main frame of a trailer and an auxiliary frame carried by the dual axles of the trailer with the frames being shiftable relative to each other.

Figure 6 is an enlarged longitudinal vertical section of an air-operated means for performing a double function.

Figure 7 is a vertical end view of the construction shown in Figure 5.

Figure 8 is a longitudinal side view of the auxiliary frame supported by dual axles and adjustably mounted in the main frame of the trailer body.

Figure 9 is a similar longitudinal side view of the auxiliary and main frames in which a single axle is employed, Figure 10 is a vertical transverse section of a fluid-operated lift for separating the frames and showing rollers carried by the lift to permit horizontal movement of the body of the trailer on the supporting auxiliary frame.

Figure 1:
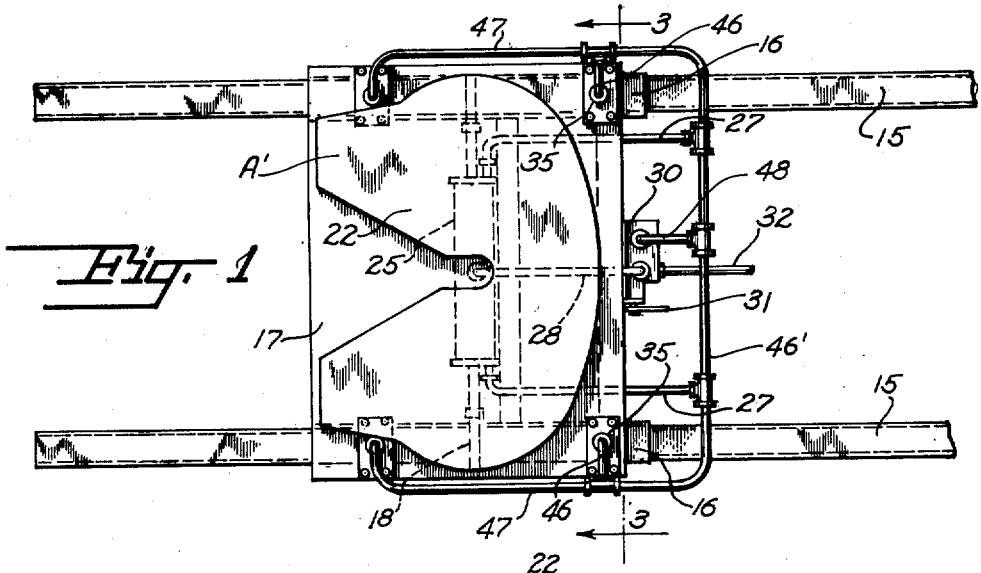
Figure 1 is a plan view of an auxiliary frame adjustably mounted on a main frame and attached to the fifth wheel mounting of a tractor.

Referring more particularly to Figures 1 to 4 inclusive, 15 designates the longitudinal U-beams or channel bars of a frame of a tractor. Channel bars or beams 16 constituting the main elements of an auxiliary frame receive the beams 15 and are shiftable thereon. A metal plate 17 connects the beams 16 together. The respective pairs of associated channel beams 15 and 16 are retained against longitudinal shifting by pins 18 passing through openings 18a in the side walls of the channel members 16 and through any one of a pair of openings 19 formed in the channel bars 15. It will be noted from Figure 1, that a plurality of the pairs of openings 19 are disposed longitudinally along the bars 15 so that the auxiliary channel bars 16 may be positioned adjustably along the bars 15. Pins 20 are employed for stopping the shifting of the bars 16 in either direction and for aligning a pair of the openings 18a in said bars with the openings 19 so that the pins 18 may be inserted through aligned openings. Latches 21 retain the pins in place.

Normally, the channel bars 16 are seated snugly on and over the channel bars 15 and are held in place on the bars 15 by the pins 18 and 20. When it is desired to move the fifth wheel mounting forwardly or to the left in Figures 1 and 2, the pins 18 and 20 must be removed. The pins 20 are withdrawn manually while the pins 18 are moved inwardly by a mechanism operated by air under pressure. Furthermore, the associated channel bars 15 and 16 must be separated sufficiently to permit shifting of the frame and the attached fifth wheel mounting.

A cylinder 25 is secured to the bottom of the plate 17 midway between the opposite side edges of said plate in any approved manner. Said cylinder, more particularly illustrated in Figure 6 is employed in a similar manner in the modified forms shown in Figures 5 and 7 to 9 inclusive. A pair of opposed pistons 26 are forced towards or away from each other by air pressure which is supplied through pipes 27 and pipe 28. A rod 29 is connected to each piston and a respective pin 18 is attached to the outer end of each rod. A casing 30 containing a valve operated by a handle 31 controls the flow of compressed air to the cylinder by means of the pipe 28 or through the pipes 27. It is to be understood that air is supplied to the pipe 28 between the pistons 26 at all times during normal travel of the vehicle to maintain the pins 18 in operative positions in the aligned openings in the bars 15 and 16. Air is supplied to the casing 30 through a pipe 32 which is in communication with a source of supply. Said supply forms normally a part of the equipment on trucks or trailers to control the brakes. The valve in the casing 30 in one position, supplies compressed air to the pipes 28, while in a second position, air is conducted through the pipes 27.

Figure 2:
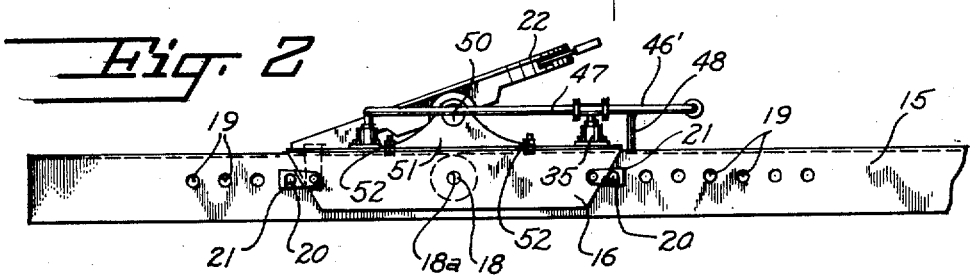
Figure 2 is a longitudinal side view of the associated frame shown in Figure 1.
Figure 3:
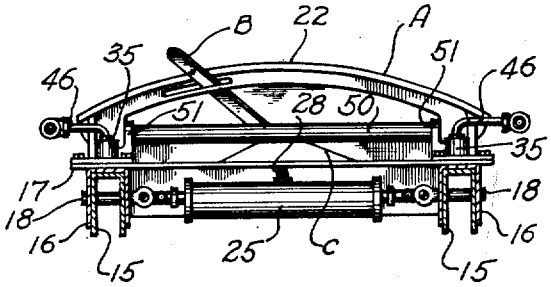
Figure 3 is a transverse vertical section taken on the lines 3—3 of Figure 1.
Figure 4:
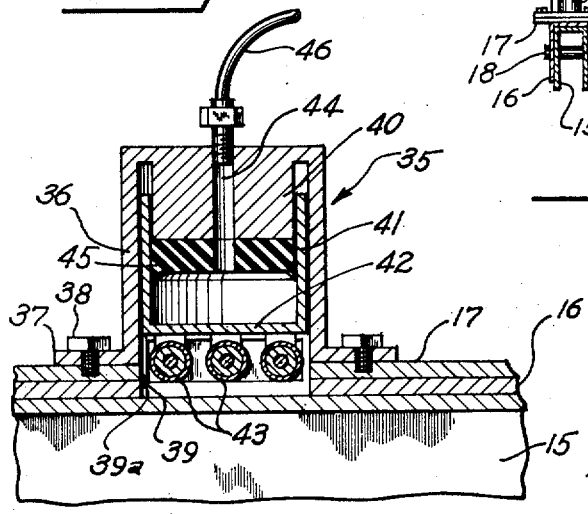
Figure 4 is an enlarged longitudinal vertical section showing the interior of a fluid-operated lifting means disposed between the auxiliary frame and the main frame.

As shown more particularly in Figures 2 to 4 inclusive, lifts 35 are positioned between the associated bars 15 and 16. Each lift (Figure 4) includes a cylinder 36 which has an annular flange 37 at its inner end bolted at 38 to the plate 17 welded to the bight portions of the channel members 16, there being a cylinder at each corner of the plate. Openings 39 in the plate align with the lower open ends of the cylinder and an opening 39a in each channel member 16. The inner upper end of each cylinder has a depending boss 40 to provide an annular space with the cylindrical wall of the cylinder 36. A circular apron 41 on a plunger 42 rides in the space. A plurality of rollers 43 are carried by each plunger and rest on the channel members 15 to facilitate shifting of the members 16 on the channel members 15 as will be explained. A port 44 extends through the boss 40 of each cylinder and through a gasket 45 to supply compressed air to the hollow piston 42 to force the rollers 43 downwardly against the bight portions of the channel members 15 for raising the plate 15 and attached channel members 16 above the channel members 15.

It will be noted from Figures 1 to 3 inclusive, that a pipe or flexible tubing 46' of U-shaped formation connects the pipes 46 of the forwardly positioned pair of cylinders 36. Branch pipes 47 connect the rearwardly disposed cylinders with the pipe 46, while another branch pipe 48 places the pipe 36 in communication with the valve casing 30. The valve in the casing is so constructed that when compressed air is supplied to the cylinder 25 (Figure 6) at the opposite ends thereof, air is also supplied to all of the cylinders 36. However, since the pins 18 present points of least resistance, they are withdrawn initially from the aligned openings in the members 15 and 16, after which the members 16 and attached instrumentalities are raised from the members 15.

The fifth wheel mounting 22 is supported on a king pin 50 rockably mounted in brackets 51 bolted to the plate 17 as at 52.

Referring more particularly to Figures 5, 7 and 8, it will be seen that a modified form of the load equalizer is applied to a trailer provided with dual axles. In this form, 60 designates parallel U beams forming part of a main frame for the trailer body. These beams are nested normally in channel members 61 forming part of an auxiliary frame. Each member 61 has a pair of spaced spring hangers 62 at each end and the bight portions of said members are cut away between the hangers for a purpose which will be explained presently. A third pair of spaced hangers 63 is located intermediate the ends of each channel member with a dual axle evener 64 pivoted on a rod 65 located intermediate the ends of said evener. The bight portion of each channel member between the hangers 63 is provided with an opening 66.

Pins 67 adjacent each end of the channel members are received by aligned openings 68 and 69 in the respective U beams 60 and the channel members 61 for retaining said members normally against shifting movement. Stop pins 70 received by the openings 68 engage the inclined edges 71 of the channel members 61 for positioning the U-beams and the channel members relative to each other after shifting movements. The pins also aid in centering the openings 68 and 69 for insertion of the pins 67. Pivoted latches 72 retain the pins 70 in place.

Springs 73 are connected by clamps 74 to axles 75 which in turn are connected together by a torque rod 76. The outer ends of the springs are attached to the hangers 62 while the inner ends of said springs are connected to the opposite ends of the rockable member 64. A torque arm 77 has pivotal connections between each clamp 74 and an end of hangers 62. Each pair of hangers may have reinforcing plates disposed therebetween with edges of said plates being welded to the vertical edges of the spaced hangers. The channel members are connected together rigidly by transverse bars 78. The rod 65 while acting as a pivot for the rockable bar 64 also joins the members 61 together.

Lifts 80 (Figure 10) identical in construction with the lifts 35 illustrated in Figure 4 are secured in any approved manner within the pairs of spaced hangers 62 and 63. The lifts however, are inverted so that the rollers 81 will move through openings 66 in the bight portions of the channel members 61 for engagement with the bight portions of the U beams 60 (Figures 8 and 10). Piston 80a carry the rollers 81.

Longitudinally disposed pipes 83 have the ends thereof in communication with the adjacent ends of transversely disposed cylinders 84. A centrally and longitudinally disposed pipe 85 is in communication with the central portions of the cylinders for supplying compressed air between the inner ends of opposed cylinders as illustrated in Figure 6. The pipe 85 communicates with a valve casing 86 having an operating stem 87 for actuating a valve in said casing for admitting air to the casing from a source of supply. Said valve also controls the flow of air to the cylinders 84 either through the pipe 85 or through the pipes 83. Branch pipes 88, 89 and 90 connect the pipes 83 with the various lifts 80. The pins 67 are attached pivotally to the adjacently disposed piston rods 91 of the cylinders 84. A transverse pipe 92 connects the rear ends of the pipes 83 together and in turn is connected to the valve casing 86 as shown at 93.

Figure 9 illustrates a load equalizer when a single axle 95 is employed and therefore, the torque rod 76, the rockable bar 64, the hangers 63 and one of the springs are eliminated, together with the central lifts 80 and the associated accessories. Thus, the channel members 96 of the auxiliary frame connected to the axle 95 by the spring 97 and torque arm 98 through the intermediary of the depending spaced hangers 98a receive the U beams 99. The other elements such as the lifts 80, the latches 72, pins 70 and pins 67 are identical in construction with the same elements shown in Figure 8. Furthermore, since the system employed for operating the lifts 80 and the pins 67 in Figure 10 is substantially identical with that described and illustrated in Figure 8, the same reference numerals will be applied to like parts without further description.

The operation of the apparatus illustrated in Figures 1 to 4 inclusive and Figure 6 is as follows: If it be desired to shift the fifth wheel mounting to the left in Figure 1, the valve in the casing 30 is operated to allow compressed air to enter the lifts 35 and the opposite ends of the cylinders 25. Since the pins 18 offer the least resistance the pistons 26 will withdraw them after which the pistons 42 will be forced downwardly whereby the channel members 16 will be separated from the members 15. The stop pins 20 will be removed to permit the auxiliary frame to be moved forwardly. In a similar manner, the auxiliary frame connected to the fifth wheel mounting may be moved rearwardly. The shifting of the fifth wheel mounting is accomplished by moving the tractor back or forth.

The operation of the load equalizer illustrated in Figures 5 to 10 inclusive is as follows: The load is shifted forwardly or rearwardly in much the same manner as the fifth wheel mounting just described. When it is desired to shift the load to the front or to the left in Figures 5, 8 and 9, the valve in the casing 86 is actuated to cause compressed air to enter the opposite ends of the cylinders 84 and the bottoms of the lifts 80 (Figure 10). The pins 67 are removed initially after which the U-beams 60 of the main frame are moved away from the channel members 61 of the auxiliary frame. The pins 70 are also withdrawn. The beams 60 riding on the rollers 81 are shifted forwardly after which the pins 70 are replaced manually while the pins 67 are returned to locking positions by regulating the valve in the casing 86 to cause the pipe 85 to supply compressed air between the pistons 26 (Figure 6).

While I have described the device as employing fluid under pressure for operating the lifts and actuating the pins, the structure is not so limited, since these devices may be readily actuated by means of air, vacuum or by means of suitable electrical power.

What I claim is:

1. A load equalizer for vehicles used in hauling trailers comprising a main frame including a pair of parallel beams attached to the vehicle, a wheel-supported auxiliary frame including a pair of parallel channel members receiving the beams, pins removably connecting the channel members and beams together, fluid operated lifts for moving the beams and channel members away from each other, air-operated means for causing the pins to be withdrawn from the beams and channel members, and means for supplying fluid under pressure simultaneously to the lifts and air to the air-operated means.

2. A load equalizer for vehicles used in hauling trailers comprising a main frame including a pair of parallel beams attached to the vehicle, a wheel-supported auxiliary frame including a pair of channel members receiving the beams, pins removably connecting the channel members and beams together, fluid operated lifts for moving the beams and channel members away from each other, air-operated means for causing the pins to be withdrawn from the beams and channel members, means for supplying fluid under pressure simultaneously to the lifts and air to the air-operated means, each lift including a piston and rollers carried by the piston, said rollers being in contact with a horizontal portion of the beams so that the frames may be shifted relative to each other.

3. A load equalizer for vehicles used in hauling trailers comprising a main frame including a pair of parallel beams attached to the vehicle, a wheel-supported auxiliary frame including channel members, each channel member receiving a beam and adjustably mounted on said beam, pins passing through aligned openings in the associated beams and channel members, air-operated means for withdrawing and returning the pins from and into the openings, lifts connected to the channel members, each lift including a fluid actuated piston, rollers on the piston engageable with the associated beam, means for supplying the lifts with fluid under pressure to cause separation of the channel members and the beams so that said beams and channel members may be moved relative to each other.

4. A load equalizer for vehicles used in hauling trailers comprising a main frame including a pair of parallel beams attached to the vehicle, a wheel-supported auxiliary frame including channel members, each channel member receiving a beam and adjustably mounted on said beam, pins passing through aligned openings in the associated beams and channel members, air-operated means for withdrawing and returning the pins from and into the openings, means connecting the channel members together for simultaneously shifting movements along the beams, lifts secured to the channel members, a fluid operated piston in each lift, rollers mounted on each piston and engageable with an associated beam, means controlling the flow of fluid under pressure to the lifts for separating the beams and the channel members sufficiently to permit relative shifting movements between the beams and the channel members.

5. A load equalizer for vehicles used in hauling trailers comprising a main frame including a pair of parallel beams attached to the vehicle, a wheel-supported auxiliary frame including channel members, each channel member receiving a beam and adjustably mounted on said beam, pins passing through aligned openings in the associated beams and channel members, air-operated means for withdrawing and returning the pins from and into the openings, lifts connected to the channel members, each lift including a fluid actuated piston, rollers on the piston engageable with the associated beam, means for supplying fluid to the fluid actuated pistons to elevate the lifts to separate the channel members and the beams so that said beams and channel members may be moved relative to each other and stop pins mounted in the openings in the parallel beams and engageable with the opposite ends of the channel members for aiding in retaining said channel members in position on the beams.

6. A load equalizer for vehicles used in hauling trailers comprising a main frame including a pair of parallel beams attached to the vehicle, a wheel-supported auxiliary frame including a pair of parallel channel members receiving the beams, pins removably connecting the channel members and beams together, actuated lifts for moving the beams and channel members away from each other, means for withdrawing and returning the pins to the beams and channel members, and means for simultaneously actuating the lifts and the means for withdrawing the pins.

*7. A movable load equalizer for vehicles used in hauling trailers comprising a main frame including a pair of parallel beams attached to the vehicle, a wheel supported auxiliary frame including a pair of parallel channel members receiving the beams, fastening means removably connecting the channel members and beams together, actuated lifts for moving the beams and channel members away from each other, means for withdrawing and returning the fastening means to the beams and channel members and means for simultaneously actuating the lifts and the means for withdrawing said fastening means.*

*8. In a vehicle having a pair of parallel beams, an auxiliary frame including a pair of channel*

*members receiving the beams, said auxiliary frame being longitudinally movable for adjustment relative to said beams, a fifth wheel carried by said auxiliary frame, fastening means for connecting said auxiliary frame to said beams, actuated lifts for moving the beams and channel members away from each other, means for withdrawing and returning said fastening means to the beams and channel members, and means for simultaneously actuating the lifts and the means for withdrawing the fastening means.*

MANFORD S. DE LAY.

References Cited in the file of this patent

UNITED STATES PATENTS

| Number | Name | Date |
|---|---|---|
| 1,450,554 | Kreissle | Apr. 3, 1923 |
| 1,621,555 | Miller | Mar. 22, 1927 |
| 2,197,401 | Weber | Apr. 16, 1940 |
| 2,332,326 | Lex | Oct. 19, 1942 |